United States Patent [19]
Handelman et al.

[11] Patent Number: 6,088,042
[45] Date of Patent: *Jul. 11, 2000

[54] INTERACTIVE MOTION DATA ANIMATION SYSTEM

[75] Inventors: David A Handelman; Stephen H Lane, both of Princeton; Vijaykumar Gullapalli, Lawrenceville, all of N.J.

[73] Assignee: Katrix, Inc., Princeton, N.J.

[ * ] Notice: This patent is subject to a terminal disclaimer.

[21] Appl. No.: 08/828,493

[22] Filed: Mar. 31, 1997

[51] Int. Cl.$^7$ .................................................. G06T 15/70
[52] U.S. Cl. ......................... 345/473; 345/474; 345/475
[58] Field of Search .................................. 345/473, 474, 345/475

[56] References Cited

U.S. PATENT DOCUMENTS

| 4,600,919 | 7/1986 | Stern ........................................ 345/473 |
| 5,214,758 | 5/1993 | Ohba et al. .............................. 345/473 |
| 5,623,482 | 4/1997 | Kunii et al. .............................. 345/473 |

OTHER PUBLICATIONS

Gullapalli, et al., "Synergy Based Learning of Hybrid Position/Force Control for Redundant Manipulators", in Proc. of the 1996 International Confrence on Robotics and Automation.

Lane, et al., "Modulation of Robotic Motor Synergies Using Reinforcement Learning Optimization" Neutral Networks in Robotics, G.A. Bekey & K.Y. Goldberg, Ed. Kluwer Academic Publishers, Boston MA 1993.

Geoffrey Hinton, "Parallel Computations for Controlling an Arm" Journal of Motor Behavior, 1984, vol 16, No. 2, 171–194.

Berkinblit, "Model of the Control of the Movements of a Multijoint Limb" Biophysics vol. 31. No. 1 pp 142–153, 1986, Printed in Poland.

Smith et al., "End Point Position Control Using Biological Concepts" 8th IEEE International Symposium on Intelligent Control, Aug. 25–27, 1993.

Badler, "Dynamic Behavior for Real Time Synthetic Humans" Course II Notes 22nd International Conference on Computer Graphics and Interactive Techniques, Aug. 6–11, 1995, Los Angeles, CA.

Hodgins et al., "Control System for Dynamically Simulated Humans" ACM Sigraph 1995, Course Notes, Georgia Institute of Technology.

(List continued on next page.)

*Primary Examiner*—Mark K. Zimmerman
*Assistant Examiner*—Kimbinh T. Nguyen
*Attorney, Agent, or Firm*—Allan Jacobson

[57] ABSTRACT

Recorded motion data is combined with interactive control techniques to manipulate the animation of articulated figures. The methods enable computer animated characters to produce fully interactive goal-directed behaviors, such as bipedal walking, through simultaneous satisfaction of position, alignment, posture, balance, obstacle avoidance, and joint limitation constraints while retaining qualitative characteristics of the original non-interactive motion data. Goal-based motion primitives, called synergies, are used to coordinate sets of joint movements that attempt to satisfy each of the above constraints. Non-interactive motion capture and keyframe data, representing examples of desired character movements, are accommodated in the present animation system in three ways: 1) direct approach—non-interactive motion data used directly to specify desired body posture synergy goals as a function of time, 2) hybrid approach—non-interactive motion data and program control commands blended to specify elements of desired position, alignment and/or balance synergy goals as a function of time, and 3) template approach—non-interactive motion data used to auto-tune adjustable parameters, enabling program control commands to generate fully interactive movements that qualitatively resemble the non-interactive motion data. The disclosed methods allow libraries of pre-configured goal-directed behaviors, such as reaching, sitting, walking, jumping, etc., to be constructed and used to animate a wide variety of characters.

42 Claims, 6 Drawing Sheets

OTHER PUBLICATIONS

Granieri, "Real Time Implementation Issues for Simulating Humans" Siggraph 1995, Course II 22nd International Conference on Computer Graphics and Interactive Techniques, Aug. 6–11, 1995, Los Angeles CA.

Hodgins, "Control Systems for Dynamically Simulated Humans" —Course II 22nd International Conference on Computer Graphics and Interactive Techniques, Aug. 6–11, 1995, Los Angeles, CA.

Metaxas, "Articulated Figure Dynamics, Control and Shape Capture" 22nd International Conference on Computer Graphics and Interactive Techniques, Aug. 6–11, 1995, Los Angeles, CA.

Granieri et al, "Behavioral Control for Real–Time Simulated Human Agents" 1995 Symposium on Interactive 3D Graphics, Monterey, CA.

Cassell et al., Animated Conversation: Rule Based Generation of Facial Expression, Gesture & Spoken Intonation for Multiple Conversational Agents Computer Graphics Proceedings, Annual Conference Series, 1994.

Badler et al., "Posture Interpolation with Collision Avoidance" Proceedings of Computer Animation 94, Geneva, Switzerland, May '94.

Badler, et al., editors, "Making Them Move, Mechanics, Control and Animation of Articulated Figures" Morgan Kaufmann Publishers, Inc., San Mateo, CA, 1991.

Badler, et al., Simulating Humans/Computer Graphics and Control Oxford University Press, New York, 1993.

Moon Ryul Jung et al: "Simulating Human Tasks Using Simple Natural Language Instructions" Proceedings of the Winter Simulation Conference, Phoenix, Dec. 8—11, 1991, No. Conf. 23, Dec. 8, 1991, pp. 1049–1057, XP00347680 Nelson B L;Kelton W D; Clark G M. * the whole document *

Blumberg B M et al: "Multi–Level Direction of Autonomous Creatures for Real–Time Virtualenvironments" Computer Graphics Proceedings, Los Angeles, Aug. 6—11, 1995, Aug. 6, 1995, pp. 47–54, XP000546215 Cook R. * the whole document*

Boulic R et al: "Goal–Oriented Design and Correction of Articulated Figure Motion with the Track System" Computers and Graphics, vol. 18, No. 4, Jul. 1, 1994, pp. 443–452, XP000546590. * the whole document *-

INTERACTIVE MOTION DATA ANIMATION SYSTEM

FIELD OF THE INVENTION

The present invention relates to the field of computer animation in which motion data is used to animate articulated characters.

BACKGROUND OF THE INVENTION

Computer assisted animation is known. In computer assisted animation, the animator is helped by the computational power of the computer to render sequences of images which, when played back frame by frame, creates the desired animation. Creating interactive sequences of animation to replicate human or animal-like motion is of particular interest to the animator, and is particularly difficult to create.

Key Framing

Computer animators have traditionally used forward kinematics approaches based upon "key framing" to produce animation. Keyframing involves specifying the positions of the joints at specific instants in time during the desired motion (the key frames), then interpolating between the positions of the joints in successive key frames to generate the intermediate positions of the joints over the time interval of the desired animation. As a result, keyframing builds motion sequences frame by frame. The keyframing approach to character animation is very tedious and time consuming, often requiring several work-days of effort to produce a few seconds of animation. Keyframing also relies heavily on the artistic abilities of the animator in order to produce realistic motions that appear smooth and natural.

Motion Capture

An alternative animation method to keyframing is known as "motion capture". In this approach, sensors attached to a human actor or a mechanical device are used to record (i.e., capture) data representing the positions of the joints of a person or animal over time during the performance of a desired motion. The result is a predetermined (i.e. "canned") motion script. This "canned" motion script is then used to drive a forward kinematic model of the character in order to produce the desired animation. Although motion capture is a powerful method for reproducing complex natural human or animal-like motion, its main drawbacks are 1) the character's body configuration is restricted to be similar to that of the performer generating the motion-capture data, 2) the resulting animations are stereotypical and limited to the set of movement data collected during the motion capture session, and 3) the range of possible movements is restricted to the movements a real person or animal is capable of performing.

It also is known to use inverse kinematics for computer animation. In inverse kinematics (IK), a desired position and/or orientation in three-dimensional space is specified for a particular part of an articulated character's body. Inverse kinematic methods are then used to calculate body joint angles such that the particular part can be moved to the desired position and/or orientation. Inverse kinematics often is used with keyframing approaches to assist the animator in manipulating the character's body into the desired postures for the key frames, thereby allowing animated character movements to be produced with less design effort.

Traditional IK methods are based on matrix manipulations that require significant amounts of on-line computation to determine the set of joint angles that enable, for example, a character's head, hands and feet to be simultaneously placed in desired locations. When matrix inverses are used, this computational requirement grows approximately as a cubic of the number of joints in the character. For example, if a traditional IK method takes 1 millisecond of computation time for a character with 1 joint, it could take approximately 1000 milliseconds for a character with 10 joints. If the character had 100 joints, it could take approximately 1000 seconds (more than 16 minutes) to perform the same computational task. Moreover, in certain joint configurations known as singular configurations, matrix-based inverse kinematic methods can completely fail to produce a solution. And finally, traditional IK does not guarantee that the collective limb and joint movements resulting from the computed joint angle motion will be natural and life-like. This is especially true when the character has redundant joints, that is, when there are more joints than the minimum needed to perform the specified motion. Since all animals have multiply redundant joints, traditional inverse kinematics approaches have serious shortcomings when applied to the animation of human or animal-like body configurations.

Interactive Animation

In keyframing and motion capture-based approaches to animation, the resulting character animations produced are scripted and non-interactive. Consequently, for interactive applications, such as video games and virtual reality simulators, keyframing and motion capture techniques are often unsatisfactory. In an interactive video game environment, a user has total freedom to choose where to go in a three dimensional (3D) world. However, the details of how the character representing the user moves and interacts with the environment are usually determined in advance by an animator. As a result, articulated characters such as human and animal-like figures found in today's games and network applications are not fully interactive. That is, the characters have a limited set of movements and always act and react in a stereotypical manner.

In a typical animated baseball game, for example, the batter can only swing high or low; there is no in-between. In a fighting game, the losing opponent goes down the same way; first time, every time. In addition to generating movements that are scripted, and hence predictable, current methods of producing interactive character animation are also tedious and time consuming to carry out, even for the most basic of human movements. The animator must create not only the primary movements of a character (e.g. kick, punch, block, etc.), but also all the transition motions that enable the character to arbitrarily sequence from one primary movement to another without any noticeable jumps, jerks or unnatural motions. Since the total number of these transitions can become incredibly large, even for a character with a small number of primary movements, the motions of most interactive characters today are restricted to movements between a few fixed body postures.

Behavioral Animation

A more attractive alternative to animating interactive characters with "canned" motion scripts, as in keyframing and motion capture approaches, is to use behaviors instead. Behaviors are defined as self-initiated movements generated in response to goal-based commands and interactions with the environment. Examples of behaviors are movements that enable a character to automatically "walk forward", "sit", "stand", "jump" and the like. High-level goal-based behaviors can be achieved using an integrated combination of both forward kinematics and inverse kinematics. The main advantage of animating characters using behaviors is that a potentially infinite variety of resulting movements can be created on-line, and modified in real-time. As a result, the characters produced by behavioral animation are both responsive to the user and interactive with their environment.

Behavioral animation is described in textbooks such as "Simulating Humans" by Badler, N. I., Phillips, C. B. and Webber, B. L, Oxford University Press, 1993, and "Making them Move" by Badler, N. I., Barsky, B. A. and Zeltzer, D., Morgan Kaufman Publishers, 1991. However, while a behavioral animation system in which a character is animated in response to a high-level command is simple and intuitive to describe, actual systems and software which achieve behavioral animation remain an elusive goal. The present invention achieves realistic real-time behavioral animation in interactive applications such as video games, virtual reality training simulators, world wide web browsers, and for generating computer-animated film and television productions.

SUMMARY OF THE INVENTION

Some of the above animation techniques are interactive and others are not. The techniques of keyframing and motion capture produce fixed, i.e., scripted and non-interactive motion data. Interactive techniques, such as behavioral animation, and others, are desirable because of their ability to provide computer generated animation in an interactive environment.

Production of interactive character animation utilizing large collected libraries of motion data (generated using both motion capture and keyframing techniques) would be highly desirable. For example, fixed film libraries contain motion data of Fred Astaire dancing. It would be desirable to use such non-interactive motion data to create interactive animated characters who dance like Fred Astaire. In a similar manner, an interactive animated character can obtain a characteristic walk (like Groucho Marx), and an interactive animated ball player can obtain the motion characteristic of a favorite athlete. e.g., running or jumping in a recognizable manner (like Michael Jordan). The present invention is directed towards combining non-interactive motion data with interactive control to achieve animation with the characteristics of both the recorded motion data and the interactive control.

In particular, the present invention is embodied in on-line computational methods for significantly enhancing playback of canned motion sequences by making the playback interactive in real time. In addition to playing back non-interactive motion data (joint angle time histories) in its original form, the data can be interactively modified to alter the motion of all or a subset of the body's joints in a goal-directed fashion, while retaining the qualitative characteristics of the original motion data. Thus, for example, if non-interactive motion data of a baseball swing is available, not only can the swing be played back as it was originally recorded, but similar swings also can be generated in which the bat trajectory is modified to swing high or low depending on the pitch.

In order to add interactive control to the playback of non-interactive motion data, a common signal interface between the two must be established. That is, both the motion data and the interactive control must be expressed in a form in which the two can be added together to animate the articulated character. In the preferred embodiment of the present invention, motion is represented as a set of joint angle commands, a contact point and a contact chain. The joint angle commands represent the angles by which each joint is to be rotated, the contact point in world coordinates is the part of the body in contact with the larger environment, and the contact chain represents the order of transform processing consistent with and derived from the stored representation of the body.

To animate the movements of a character's body, a limb coordination system is used that performs separate calculations at each joint using goal-based motion primitives called synergies. A synergy is a process which produces a set of joint angle movements that attempt to satisfy a higher-level goal, such as a position, alignment, posture, balance, obstacle avoidance, or joint limitation constraint. Five primary synergies are preferred in the present limb coordination technology: Position, Alignment, Avoidance, Balance and Posture. Together, these synergies provide a comprehensive ability to interactively control the motion of the character's body. Each of the synergies produces a set of joint angle movements that attempt to satisfy one constraint. When the synergies are combined with different weights, the resulting motion is a blend of the motion due to each constraint. Motion is effected by giving more weight to one synergy. For example, for a fighting character, more weight might be given to balance rather than posture, so the character is less likely to fall down. For a dancer, motions might look more fluid if additional weight were given to movements centered around particular body postures.

In the present invention, motion data is translated to be expressed in the same form as motion commands derived from synergies. Then, the motion data can be compared or combined with the synergy outputs to produce motions having the characteristics of both. The amount of influence of the motion data therefore depends, like any other synergy, on the weight given to it.

In the present invention, non-interactive motion data is combined with the interactive limb coordination in three ways.

Direct Combination

In the present invention, interactive motion data animation technology is used to control the motion of a subset of the free joints during the course of playback. For example, if non-interactive motion data for a walking gait only specified how the legs and hips move during the walk, the motion data is used to direct leg and hip movement, while synergy-based control is used to drive the motion of the arms, either to swing realistically to match the gait, or to perform any task required such as pointing, waving, or gesturing in an interactive and realistic fashion. In addition, when non-interactive motion data is directly used, the interactive motion data animation technology of the present invention enables smooth transitions to be generated from one motion sequence to the next in a sequence automatically, such as transitions from purely synergy-based control to non-interactive motion data playback and back again to purely synergy-based control.

Hybrid Combination

In the hybrid approach, both non-interactive motion data and interactive animation program control commands are blended to specify elements of desired position, alignment, avoidance, posture, balance and/or joint limitation synergy goals as a function of time. The non-interactive motion data provides one set of joint angle commands as a function of time. The synergy-based limb coordination provides another set of joint angle commands as a function of time. Since the joint angle commands from both motion capture data and interactive based synergies are combined, the resulting motion is both interactive, and bears a resemblance to the original non-interactive motion data.

Template Creation

In the template approach, non-interactive motion data is used to create a template for interactive synergy based control, enabling purely synergy-based animation control to interactively produce motions characteristic of the original motion data movement sequences. Samples of motion data are compared to movement data from synergy-based interactive control, for similar tasks or behaviors. The error between the non-interactive motion data and the synergy-based data is quantified using a suitable error function. The parameters of the synergy-based control, such as synergy strengths and gains, are then modified, and the process is repeated, so as to minimize the error. Any one of a number of well known error minimization techniques, such as least squares minimization, may be used in the process. Creating a template from non-interactive motion data "tunes" the adjustable synergy parameters, enabling subsequent program control to generate fully interactive movements that qualitatively resemble the original motion data.

The present methods integrate non-interactive motion data with interactive control, taking into account multiple motion sequences with arbitrary transitions between sequences, and multiple interactively specified goals and constraints. As a result, the present methods are capable of producing seamless playback of non-interactive motion data sequences with additional fully interactive goal-directed behaviors in real-time through simultaneous satisfaction of position, alignment, posture, balance, obstacle avoidance, and joint limitation constraints.

DETAILED DESCRIPTION

Character Representation

The physical structure of a character is referred to as a "body". A body is a skeleton comprised of "links" connected together by "joints" in a hierarchical tree-like structure. Joints are body joints such as wrists and elbows, while links are body parts between joints, such as forearms, lower leg, foot, etc. Each link has various attributes associated with it, the most important of which are its mass and physical dimensions. The dimensions are usually fixed, but they can be variable if the link can, for example, elongate or shrink in size. Joints join two links together in a way that allows them to rotate in relation to each other about the joint's axes of rotation. The preferred embodiment uses Euler angles to represent the orientation of a joint relative to its parent. Any order of rotation about three orthogonal coordinate axes in a frame of reference may be used.

The entire body is "anchored" at a point in its 3D environment to a point of the body called the "contact point" or "anchor point". As used herein, when relative position reference is made with respect to a plurality of joints, those joints closer to the contact point in the joint hierarchy (in terms of the number of links between them and the contact point) will be referred to as relatively "proximal" joints, while those joints further away from the contact point in the joint hierarchy will be referred to as relatively "distal" joints. Joints may thus be ordered in terms of their distance in the joint hierarchy from the contact point, proximal-to-distal, or vice versa.

In a preferred embodiment of the invention, the interactive motion capture playback system consists of the following components:

BODY: a tree-like data structure used to represent the hierarchical relationship and physical properties of the joints and links in an articulated figure's body. A limb coordinated body can have any joint serve as the origin (i.e. contact point) for the body's forward kinematic chain computations.

SYNERGIES: Low-level goal-based motion primitives producing joint movement commands that attempt to satisfy position, alignment, balance, posture, avoidance or joint limitation constraints.

SYNGROUPS: Groups of synergies that, when activated, produce goal-directed actions that attempt to satisfy multiple constraints.

SYNERGY COORDINATION: A mechanism for combining the joint rotations produced by all the active synergies in order to ensure concurrent satisfaction of their multiple constraints.

MOTION CAPTURE SEQUENCES: Pre-recorded animation sequences that are to be played back in a user-specified order to animate the specified body.

Representation of a Body

Figure 4:
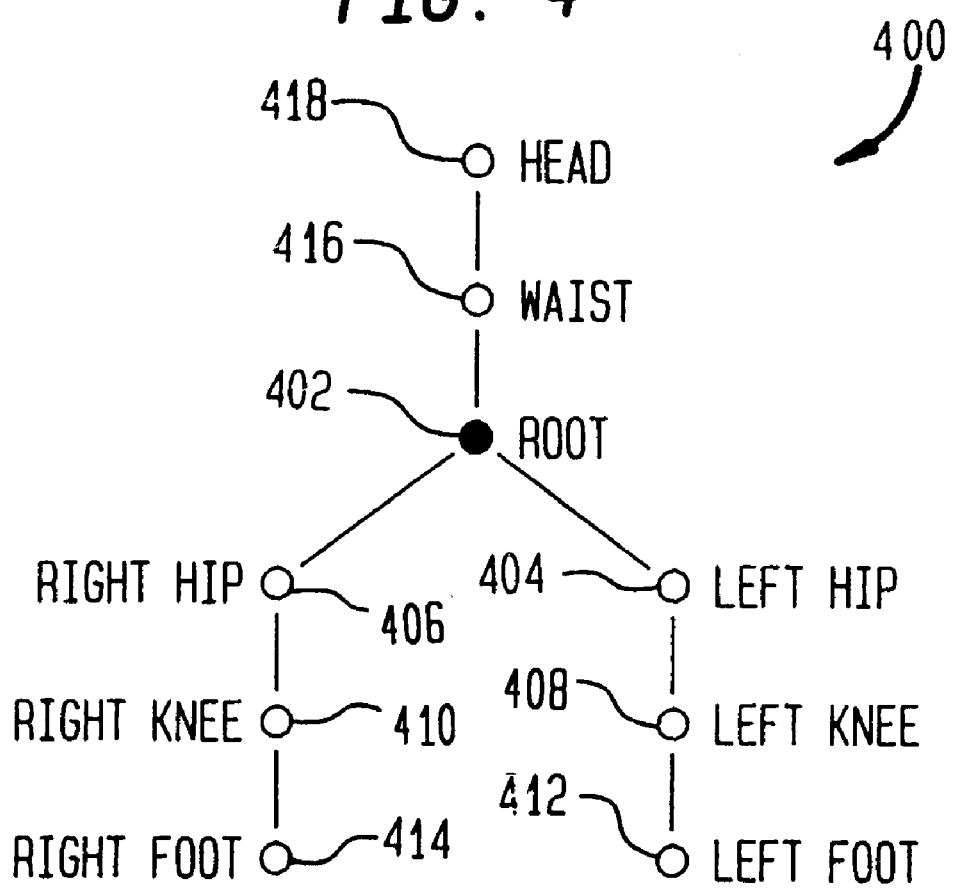
FIG. 4 is an example of a joint hierarchy for an armless biped character.

In the limb coordination system, a body skeleton composed of joints is maintained for each articulated character. The parenting relationship of one joint to another defines the body topology, which can be represented by a tree structure 409. An example of joint parenting, for an armless biped character, is illustrated by the topology in FIG. 4. The joints are root 402, left hip 404, right hip 406, left knee 408, right knee 440, left foot 412, right foot 414, waist 416 head 418.

The root joint specifies the origin of the joint tree, and therefore has no parent. On the left side of the body, the left hip is parented to the root, the left knee is parented to the left hip, and the left foot is parented to the left knee. On the right side of the body, the right hip is parented to the root, the right knee to the right hip, and the right foot to the right knee. Finally, the waist is parented to the root, and the head is parented to the waist.

Each joint has additional properties associated with it, including a mass, a preset position and orientation relative to its parent, the joint's position and orientation relative to its preset position and orientation, relative position and orientation limits, a reference to a graphical object representing an associated body part, and dimensions of a bounding box (length, width, and height) to be used in collision detection computations.

A joint also has a type: regular joint or ball joint. The orientation of a regular joint is referenced to (is relative to) its parent, whereas the orientation of a ball joint is referenced to some other coordinate system, usually the world coordinate system. Ball joints function as convenient "inertial" platforms that goals can be specified with respect to. For example, a ball joint located at the waist of a biped that moves with the waist, but always remains level, is a convenient frame of reference for specifying the coordinates of positioning and alignment hand and head goals.

During limb coordination, the character body is assumed to have a "contact point" that specifies the point on the skeleton that is anchored in the world. It is the starting point for computing the forward kinematics of the body. For example, the contact point (cp) for a biped standing on its left foot is its left foot joint. In conventional systems, the "root" of the body remains the contact point when computing the forward kinematics of a character. However, in the Limb Coordination System, any point (or joint) of a body can be used as a contact point.

Synergies

A synergy is a computational mechanism for coordinating the motion of a subset of body joints in order to satisfy a specific goal-based constraint. Each synergy has a contact point, a list of joints, a goal, and a set of gains associated with it. Individual joints may be associated with any number of synergies. Given a value for a synergy goal and the current state of the body, each synergy computes how the set of joints it coordinates should move in order to achieve its goal. Relative gains are specified for each of the joints in a synergy, allowing some joints to contribute more towards meeting the synergy's goal than others. Synergy gains can range from 0.0, implying no contribution to the motion of a joint, to 1.0 implying that the joint is moved to the full extent of its computed motion. In addition, each synergy has a strength assigned to it. The synergy strength determines the contribution of that synergy to the total amount of movement computed for the joints. Synergy strengths also range between 0.0 and 1.0. A Synergy Coordination mechanism determines how individual synergy joint movements are combined with the joint movements suggested by other synergies.

The object of a synergy is to position and/or orient a specific control point to satisfy a goal-based constraint. The control point can be any point, joint or vector associated with the body. The specification of the goal for a synergy has three elements: the control point to be positioned, the goal point (the desired location and/or orientation of the control point), and the coordinate frame in which the goal point location is specified. The specification of such a coordinate frame allows the desired goal point location to be specified relative to an any arbitrary coordinate system in 3D space, including that of any other joint. Thus, for example, one can specify where the left hand should be relative to the right hand and the synergy will try to maintain that relative position even as the right hand moves through space.

Five primary synergies are used in the limb coordination technology: Position, Balance, Posture, Alignment and Avoidance. The synergies of Balance, Posture, Alignment, Avoidance each will produce a respective set of joint angle commands responsive to input goals to rotate each of the body joints to produce animation. The actual joint angle commands which will be used to animate the articulated character are derived by selecting the input goals and selecting the gains, i.e., the relative strength, when combining each respective synergy to produce the final joint angle commands.

Synergy Groups

Synergies are organized into Groups called SynGroups. A SynGroup is a collection of synergies associated with a particular contact point that contributes to some larger scale task and serves to define the relative priority of each synergy for that task. When a SynGroup is activated during character animation, it attempts to simultaneously satisfy the goals of all of the synergies in the group using the Synergy Coordination mechanism 18. Syngroups are activated when interactive control is desired during playback, and provide synergy goals with values, set priorities and adjust synergy strengths and gains. The synergies then produce joint angle rotations that serve to satisfy their individual goals.

Synergy Coordination

A Synergy Coordination process determines the relative contribution of each synergy to the overall movement. Through the combination of joint angle rotations from each active synergy, animation is produced that attempts to satisfy multiple goals and constraints. The Synergy Coordination process also implements joint limitation constraints as the last step of synergy coordination.

Interactive Motion Data Playback

Generation of interactive motion data is achieved by using a hybrid approach in which non-interactive motion data playback and synergy-based control is blended at each time step to satisfy specified goals. Let $\Theta(t)$ denote the joint angles at time t specified by the non-interactive motion data, and let $\Delta\Theta(t)$ be the synergy-based control command computed at time t based on the body state and the goals at time t. Blending is achieved by using the joint angles $$\Phi(t) = \Theta(t) + \sum_{\tau=0}^{t} f(\Delta\Theta(\tau), \tau)$$

as the body's configuration at time t. Here, f(.,.) is a time-dependent blending function that determines the relative weight of the synergy-based control component at each time step during playback. For example, if $$f(\delta, \tau) = \begin{cases} 0, & \text{if } \tau < T/2 \\ \delta, & \text{otherwise,} \end{cases} \text{ where } \delta = \Delta\Theta(\tau)$$

where T is the total duration of the motion, then synergy based interactive control will only be effective in the second half of the motion and the first half of the motion is generated solely by motion capture data playback.

A side-effect of blending non-interactive motion data and interactive synergy-based control is that the body configuration at the end of playing back a sequence can be different after each playback. Lack of a deterministic end configuration could be a problem, especially if the next sequence to play starts in a configuration different from the one in which the present sequence playing has just ended. The continuity problem is overcome by using transition sequences to control the motion at the start and end of motion data playback. A transition sequence is generated in the present embodiment based on the initial and final positions and velocities of all the body's joints and goal positions. The user can specify the length of the transition sequence in terms of the number of time steps before the end of a sequence that the transition period starts and the number of time steps into the next sequence before the transition period ends.

Figure 1:
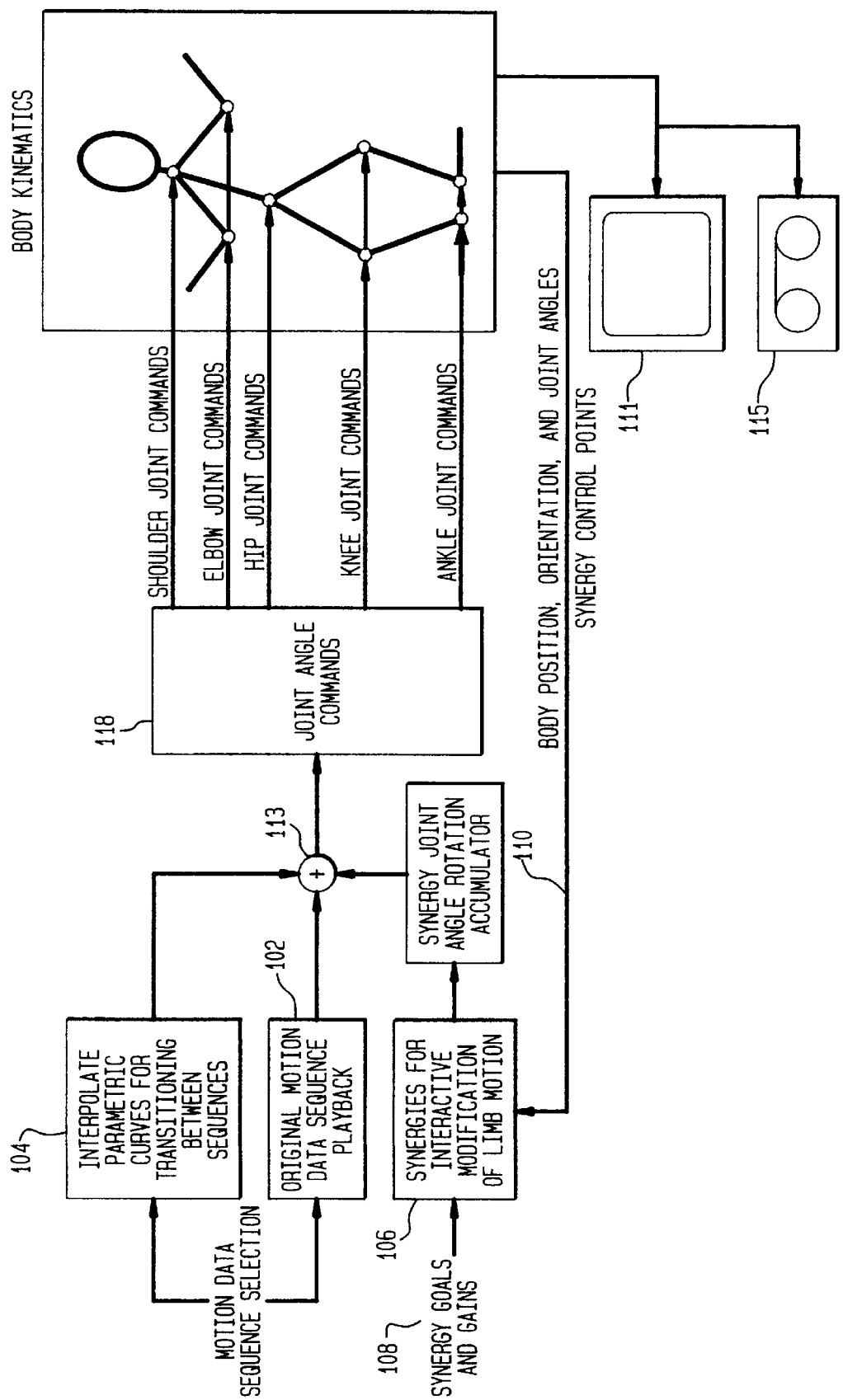
FIG. 1 is a block diagram of the overall system of interactive motion capture playback embodying the present invention.

An overview of the interactive motion data animation system is shown in FIG. 1. Three components are used to generate interactive motion data from recorded motion sequences. If a single original sequence is to be played back, the original sequence data 102 is sent as joint angle commands to the body, resulting in a reproduction of the recorded animation. If more than one sequence is to be played back, then it becomes necessary to smoothly connect the motion between sequences so that the overall movement is not abrupt or jerky. A smooth connection is accomplished by generating on-line transition sequences 104 obtained by constructing interpolating parametric curves between the two sequences. Each transition sequence specifies modifications to the nominal current sequence that will result in a smooth transition into the next sequence. These modifications are added to the joint angle commands from 102 during playback.

If interactive control of the body is desired during playback, synergies 106 and their associated control points are defined for the body. These synergies are assigned appropriate strengths and gains and are supplied with goals interactively 108. In addition, the synergies are provided with feedback 110 of the current body position and orientation and the body joint angles. Using this information, the synergies generate joint rotations which, when accumulated during the motion 112 and added 113 to the motion data 102, resulting in a modified motion of the body that satisfies the synergy goals. Note that in order to permit interactions while playing back several sequences and transiting between sequences, the transition sequence in 104 includes interpolated curves for the goal points used in the interactions. By adding 113 a transition sequence 104 to the motion data 102, a smooth interaction is possible even as the character performs several sequences in a row.

The outputs 118 of the of the combination of motion data 102, interpolation data 104 and synergy commands 106, 112, are commands to the body kinematics function 16, which, in cooperation with the image storage, rendering and display functions actually animate the character by generating video for display 111 or storage 115, which may be a magnetic tape or form of disk storage media, or any computer memory.

Figure 2A:
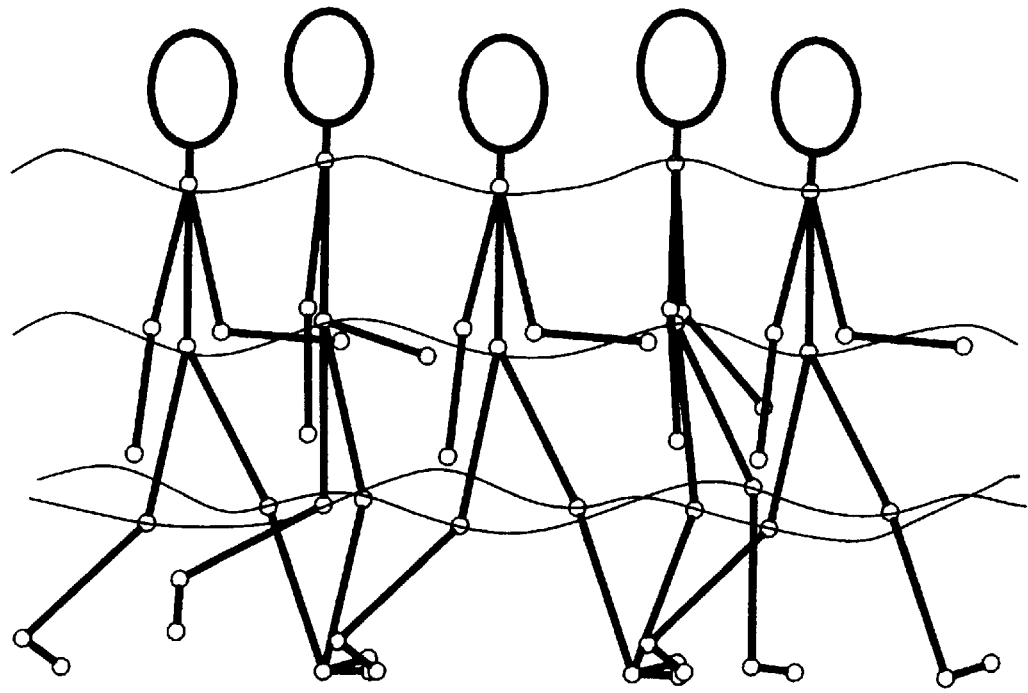
FIG. 2A is a stick figure illustrating a motion capture sequence.
Figure 2B:
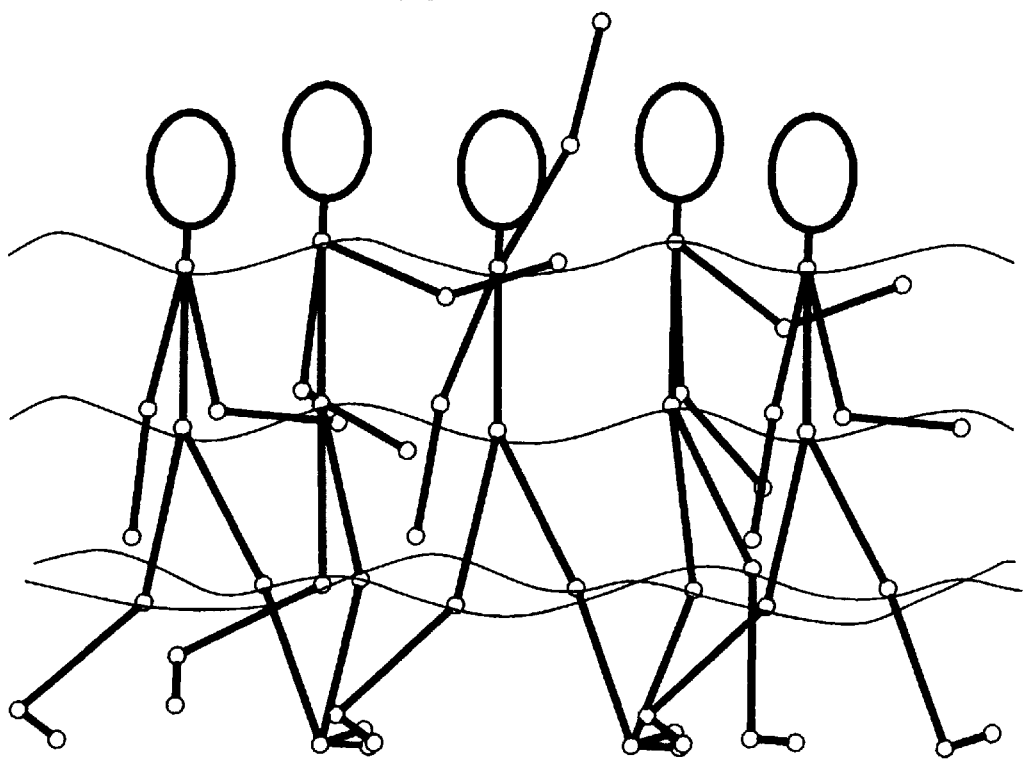
FIG. 2B is a is a stick figure illustrating a motion capture sequence integrated with a synergy based interactive sequence in accordance with the present invention.

FIGS. 2A and 2B illustrate an example of the above interactive motion data animation system. The original sequence, shown in FIG. 2A, consists of data for a normal walk with the arms swinging by the side of the body. If it is now desired to wave the right hand while the character is walking as before, the right hand is specified as a control point for a positioning synergy and its goal is specified as a trajectory that results in a wave. The synergy generates appropriate modifications to the non-interactive joint angle motion data that will result in the desired right hand wave while the rest of the body continues to walk as in the original sequence as shown in FIG. 2B.

Figure 3:
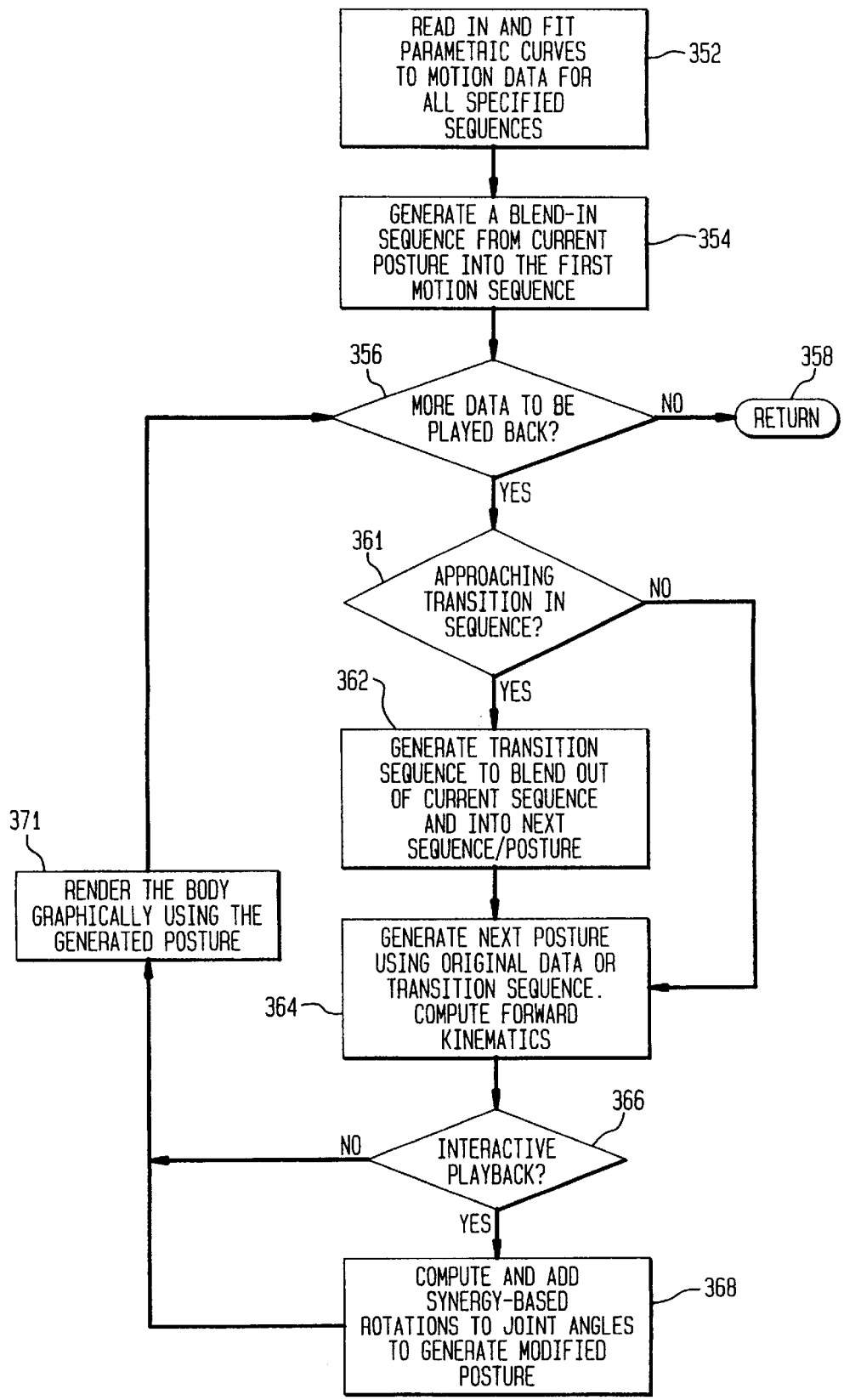
FIG. 3 is a flowchart diagram illustrating interactive motion capture playback in accordance with the present invention.

FIG. 3 is a flow chart diagram of the interactive motion data animation system. In step 352 of FIG. 3, for each specified motion data sequence, the motion data is read in and processed by fitting parametric curves to the data for each joint. To begin playback, a blend in (connecting) sequence is first generated in step 354 for the transition from the current body posture into the first motion sequence. Blending sequences are represented as parametric curves associated with each joint and synergy goal. In the present embodiment, these curves are generated taking into account the position and velocity of each joint's/goal's motion. Additional factors such as joint or goal accelerations also can be incorporated into the blending sequences.

Playback is then started by passing through the data time-step by time-step, checking for more data in step 356 and exiting the program if there is no more data to playback in step 358. If there is more playback data, then the program checks to see if the current data sequence is approaching its end in step 361. If it is, in step 362, a transition sequence is generated to blend out of the current sequence and into the next, if a next sequence is specified. If no next sequence is specified, the transition sequence blends out to a fixed posture of the body. The next posture for the body is generated in step 364 using either the original data or the transition sequence if one is active. The position of the body is then computed from the generated posture using forward kinematics.

If interactive playback is desired in step 366, synergies driven by the error between the body part positions and their interactively specified goal positions are used to compute rotations to joint angles that minimize the errors. The joint rotations computed by the synergies in step 368 are added to the joint angles of the body, resulting in a modified posture for the body that accommodates the interactively specified goals while playing back the original motion data. This posture is rendered at step 371, and the process is repeated from step 356.

Direct Motion Data Playback

In the arrangement of FIG. 1, non-interactive motion data 102 provides joint angle commands 118 to control body kinematics 116. When no contribution is made from interactive synergies 106, then animation is generated purely by non-interactive motion data playback. For example, it might be desirable to have the character's legs march (as in a parade) according to stored motion data, while the character's upper body (waving an arm) is under interactive synergy based control. One subset of joints is thus controlled by non-interactive motion data at the same time that an another subset of joints is controlled by interactive synergies.

Hybrid Motion Data Playback

Non-interactive motion data 102 may be actively blended with interactive synergy control of body kinematics 116. The blending of non-interactive motion data and interactive joint angle command data is accomplished by the same type of coordination as is carried out between the different synergies. Each synergy provides a set of joint angle commands for motion generated subject to a constraint, such as balance and the like. In the case of blending non-interactive motion data with interactive synergy based control, the motion data 106 is treated similar to the synergies, in that the non-interactive motion data joint angle commands are combined with the synergy joint angle commands, and thus becomes one of the factors influencing limb coordination.

Template Approach

Figure 5:
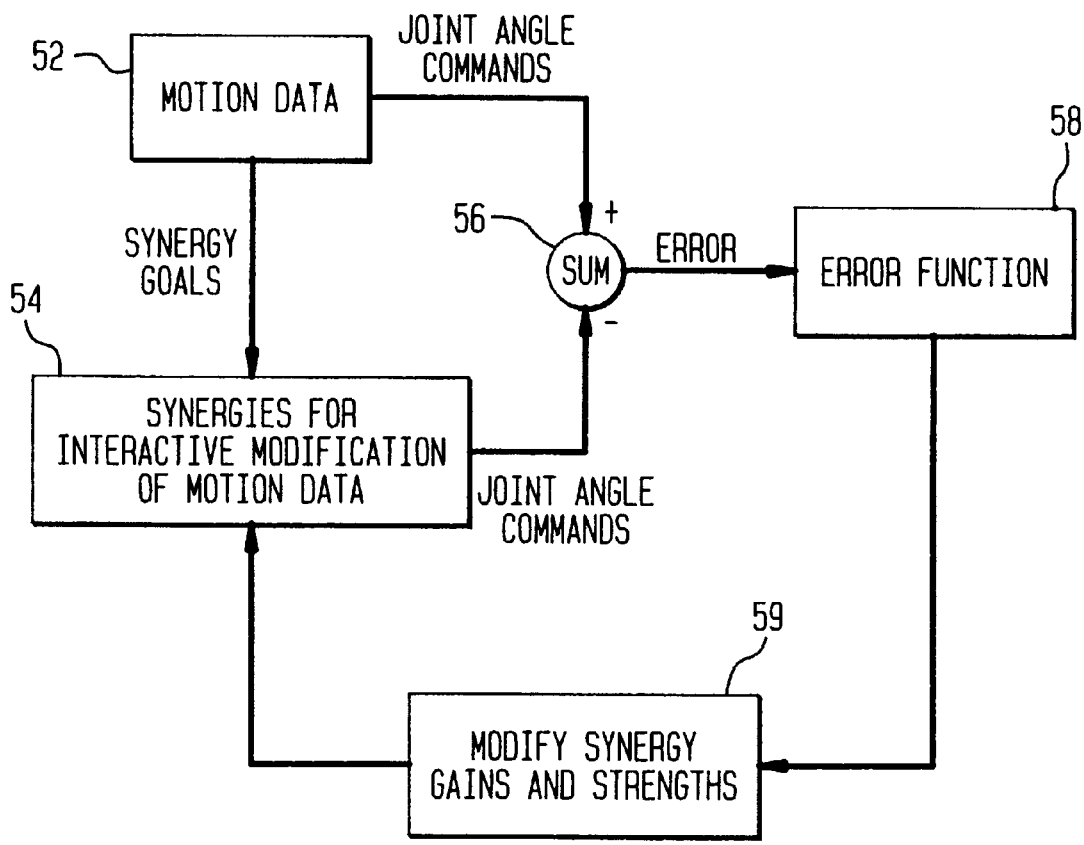
FIG. 5 is a block diagram of a system for creating a template using motion capture data to tune a synergy based interactive computer animation system.

A different way to blend non-interactive motion data with interactive synergy-based control is to tune the parameters of the synergy-based interactive animation so that the output matches the non-interactive motion data as closely as practical. The primary adjustable parameters are synergy strengths and gains. In FIG. 5, non-interactive motion data 52 provides joint angle commands. Similarly, interactive synergies 54 provide joint angle commands. The difference between the two sets of joint angle commands is provided by the summer 56. A suitable error function 58, measures the difference between the non-interactive motion data joint angle commands and the joint angle commands produced under interactive control. The measured difference expressed as an error function is used to modify the synergy gains and strength factors.

Figure 6:
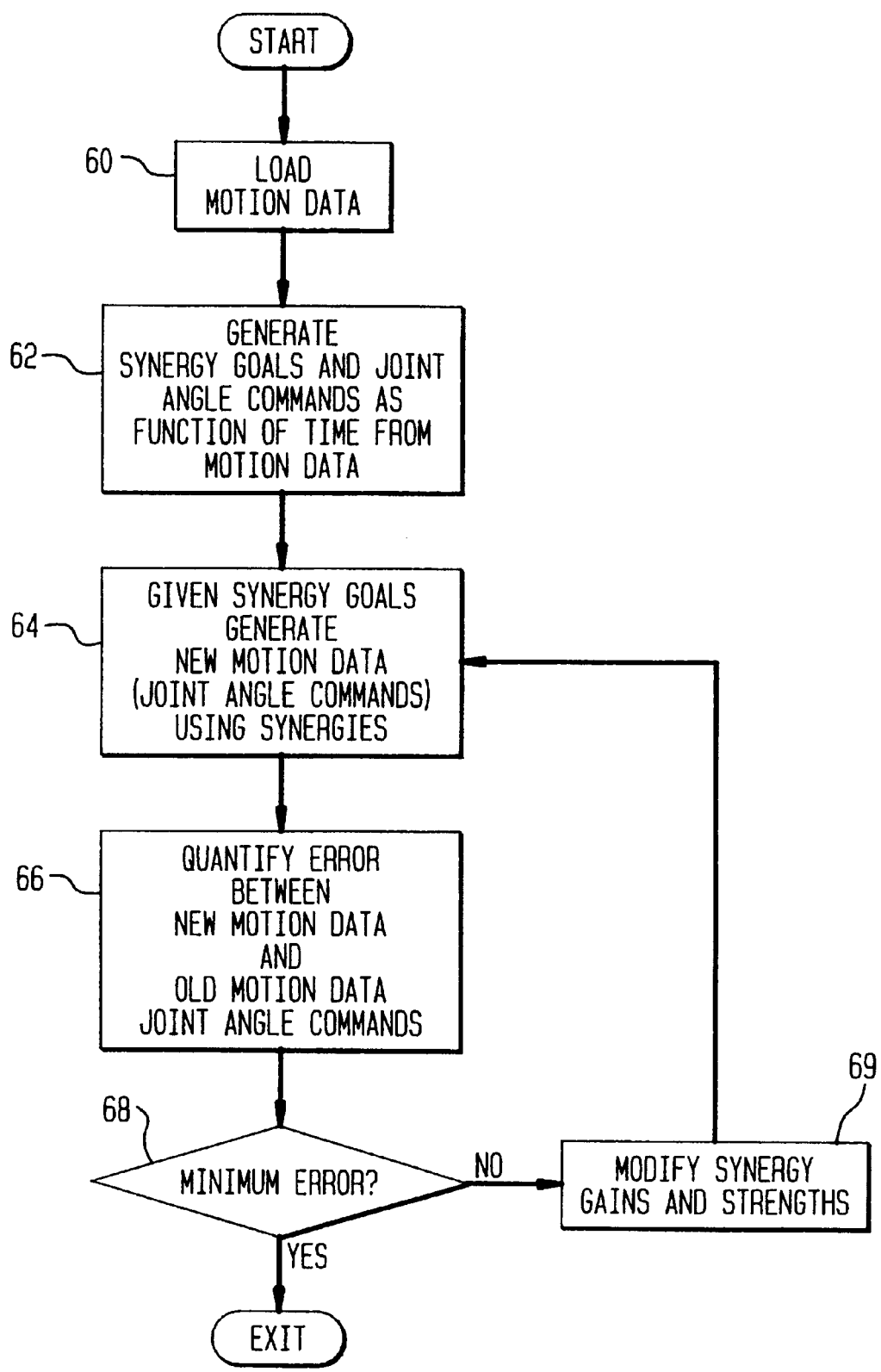
FIG. 6 is a flowchart diagram illustrating a method for creating a template using motion capture data to tune a synergy based interactive computer animation system.

A flow chart of the template generation process is illustrated in FIG. 6. First, non-interactive motion capture data is loaded 60 and played. Synergy goals and joint angle commands are generated as a function of time 62 from the non-interactive motion data. Using the computed synergy goals, new motion data (new joint angle commands) are generated using synergy based limb coordination.

The error, or difference between the joint angle commands from the non-interactive motion data and the joint angle commands from the synergies, is quantified at step 66. If the error is above some minimum at step 68, then the synergy gains and strengths are modified at step 69, and the process is repeated at step 64. For each iteration, the error is reduced, until the error is below some minimum, and the program exits at step 68.

The blending of non-interactive motion data directly, using a hybrid approach, or by template generation allows animated characters to exhibit the characteristics and nuances of recorded motions generated using keyframe, motion capture or other animation techniques, while at the same time exhibiting fully interactive behaviors.

What is claimed is:

1. A method for animating a character figure in a video image memory responsive to stored motion data, said character figure being represented in said memory as having a first plurality of joints and a plurality of links coupled between respective pairs of said first plurality of joints, said plurality of links representing respective limbs of said character figure, said method further responsive to an input goal to animate said character subject to at least one constraint, said method comprising:

storing a representation of each of said first plurality of joints in said memory;

storing a representation of each of said plurality of links in said memory;

storing a representation of the respective positions of said first plurality of joints and said plurality of links in said memory;

computing, responsive to said stored motion data, a first set of motions derived from said stored motion data for each of said first plurality of joints respectively;

computing, responsive to said input goal, a second set of motions subject to said constraint for each of said first plurality of joints respectively;

combining said first set of motions with said second set of motions to form a combined set motions;

modifying said stored representation of the positions of said first plurality of joints and said plurality of links in said memory using said combined set of motions; and rendering said stored representation of said links as the limbs of said character figure in said video image memory.

2. A method in accordance with claim 1, further including:

computing, responsive to said stored motion data, a third set of motions derived from said stored motion data for each of said first plurality of joints respectively, wherein said stored motion data includes at least first and second motion sequences, said third set of motions being computed from said first and second motion sequences to smoothly blend said first motion sequence into said second motion sequence;

combining said third set of motions with said combined first set of motions and said second set of motions to form a second combined set motions; and modifying said stored representation of the positions of said first plurality of joints and said plurality of links in said memory using said second combined set of motions.

3. A method in accordance with claim 2, wherein said third set of motions is computed by fitting a curve between said first motion sequence and said second motion sequence.

4. A method in accordance with claim 2, wherein said third set of motions is computed by fitting a curve between said first motion sequence to a predetermined fixed position of said character figure.

5. A method in accordance with claim 1, wherein said constraint is position.

6. A method in accordance with claim 1, wherein said constraint is alignment.

7. A method in accordance with claim 1, wherein said constraint is obstacle avoidance.

8. A method in accordance with claim 1, wherein said constraint is balance.

9. A method in accordance with claim 1, wherein said constraint is posture.

10. In an interactive method for animating a character figure in a video image memory responsive to stored motion data, said character figure being represented in said memory as having a first plurality of joints and a plurality of links coupled between respective pairs of said first plurality of joints, said plurality of links representing respective limbs of said character figure, said method further responsive to an input goal to animate said character subject to at least one constraint, wherein said interactive method for animating said character figure has at least one adjustable motion parameter, a method for adjusting said adjustable motion parameter in accordance with said stored data, said method comprising:

calculating a value of said adjustable motion parameter from said stored motion data;

using said calculated value of said adjustable motion parameter in said interactive method for animating a character figure to generate interactive motion data;

comparing said stored motion data to said interactive motion data;

quantifying the error between said stored motion data and said interactive motion data;

comparing said error to a predetermined error value; and modifying said calculated value of said adjustable motion parameter if said error is greater than said predetermined error value;

whereby said adjustable motion parameter is adjusted in accordance with said stored motion data.

11. A method in accordance with claim 10, wherein said interactive method for animating a character figure includes the step of generating said interactive motion data from at least one synergy, wherein a synergy is a process which produces a set of joint angle movements subject to said constraint, which joint angle movements attempt to satisfy an input goal.

12. A method in accordance with claim 11, wherein said adjustable parameter is a synergy gain.

13. A method in accordance with claim 11, wherein said adjustable parameter is a synergy strength.

14. In an interactive method for animating a character figure in a video image memory responsive to stored motion data, said character figure being represented in said memory as having a first plurality of joints and a plurality of links coupled between respective pairs of said first plurality of joints, said plurality of links representing respect limbs of said character figure, said method further responsive to an input goal to animate said character subject to at least one constraint, wherein said interactive method for animating said character figure has at least one adjustable motion parameter, a method for adjusting said adjustable motion parameter in accordance with said stored data, said method comprising:

calculating stored motion joint angle commands from said stored motion data;

determining a stored input goal from said stored motion data;

generating interactive motion data using said stored input goal in said interactive method, wherein said interactive method uses at least one synergy, wherein a synergy is a process which produces a set of interactive joint angle movements subject to said constraint, which interactive joint angle movements attempt to satisfy said stored input goal;

calculating the error between said stored motion joint angle commands and said interactive joint angle commands;

comparing said error to a predetermined error value; and modifying at least one parameter of said interactive method if said error is greater than said predetermined error value;

whereby said parameter of said interactive method is adjusted in accordance with said stored motion data.

15. A method in accordance with claim 14, wherein said adjustable parameter is a synergy gain.

16. A method in accordance with claim 14, wherein said adjustable parameter is a synergy strength.

17. A method in accordance with claim 14, wherein said constraint is position.

18. A method in accordance with claim 14, wherein said constraint is alignment.

19. A method in accordance with claim 14, wherein said constraint is obstacle avoidance.

20. A method in accordance with claim 14, wherein said constraint is balance.

21. A method in accordance with claim 14, wherein said constraint is posture.

22. An apparatus for animating a character figure in a video image memory responsive to stored motion data, said character figure being represented in said memory as having a first plurality of joints and a plurality of links coupled between respective pairs of said first plurality of joints, said plurality of links representing respective limbs of said character figure, said apparatus further responsive to an input goal to animate said character subject to at least one constraint, said apparatus comprising:

means for storing a representation of each of said first plurality of joints in said memory;

means for storing a representation of each of said plurality of links in said memory;

means for storing a representation of the respective positions of said first plurality of joints and said plurality of links in said memory;

means for computing, responsive to said stored motion data, a first set of motions derived from said stored motion data for each of said first plurality of joints respectively;

means for computing, responsive to said input goal, a second set of motions subject to said constraint for each of said first plurality of joints respectively;

means for combining said first set of motions with said second set of motions to form a combined set motions;

means for modifying said stored representation of the positions of said first plurality of joints and said plurality of links in said memory using said combined set of motions; and means for rendering said stored representation of said links as the limbs of said character figure in said video image memory.

23. An apparatus in accordance with claim 22, further including:

means for computing, responsive to said stored motion data, a third set of motions derived from said stored motion data for each of said first plurality of joints respectively, wherein said stored motion data includes at least first and second motion sequences, said third set of motions being computed from said first and second motion sequences to smoothly blend said first motion sequence into said second motion sequence;

means for combining said third set of motions with said combined first set of motions and said second set of motions to form a second combined set motions; and means for modifying said stored representation of the positions of said first plurality of joints and said plurality of links in said memory using said second combined set of motions.

24. An apparatus in accordance with claim 23, wherein said third set of motions is computed by fitting a curve between said first motion sequence and said second motion sequence.

25. An apparatus in accordance with claim 23, wherein said third set of motions is computed by fitting a curve between said first motion sequence to a predetermined fixed position of said character figure.

26. An apparatus in accordance with claim 22, wherein said constraint is position.

27. An apparatus in accordance with claim 22, wherein said constraint is alignment.

28. An apparatus in accordance with claim 22, wherein said constraint is obstacle avoidance.

29. An apparatus in accordance with claim 22, wherein said constraint is balance.

30. An apparatus in accordance with claim 22, wherein said constraint is posture.

31. In an interactive apparatus for animating a character figure in a video image memory responsive to stored motion data, said character figure being represented in said memory as having a first plurality of joints and a plurality of links coupled between respective pairs of said first plurality of joints, said plurality of links representing respective limbs of said character figure, said apparatus further responsive to an input goal to animate said character subject to at least one constraint, wherein said interactive apparatus for animating said character figure has at least one adjustable motion parameter, an apparatus for adjusting said adjustable motion parameter in accordance with said stored data, said apparatus comprising:

means for calculating a value of said adjustable motion parameter from said stored motion data;

means for using said calculated value of said adjustable motion parameter in said interactive apparatus for animating a character figure to generate interactive motion data;

means for comparing said stored motion data to said interactive motion data;

means for quantifying the error between said stored motion data and said interactive motion data;

means for comparing said error to a predetermined error value; and means for modifying said calculated value of said adjustable motion parameter if said error is greater than said predetermined error value;

whereby said adjustable motion parameter is adjusted in accordance with said stored motion data.

32. An apparatus in accordance with claim 31, wherein said interactive apparatus for animating a character figure includes the means for generating said interactive motion data from at least one synergy, wherein a synergy is a process which produces a set of joint angle movements subject to said constraint, which joint angle movements attempt to satisfy an input goal.

33. An apparatus in accordance with claim 32, wherein said adjustable parameter is a synergy gain.

34. An apparatus in accordance with claim 32, wherein said adjustable parameter is a synergy strength.

35. In an interactive apparatus for animating a character figure in a video image memory responsive to stored motion data, said character figure being represented in said memory as having a first plurality of joints and a plurality of links coupled between respective pairs of said first plurality of joints, said plurality of links representing respective limbs of said character figure, said apparatus further responsive to an input goal to animate said character subject to at least one constraint, wherein said interactive apparatus for animating said character figure has at least one adjustable motion parameter, an apparatus for adjusting said adjustable motion parameter in accordance with said stored data, said apparatus comprising:

means for calculating stored motion joint angle commands from said stored motion data;

means for determining a stored input goal from said stored motion data;

means for generating interactive motion data using said stored input goal in said interactive apparatus, wherein said interactive apparatus uses at least one synergy, wherein a synergy is a process which produces a set of interactive joint angle movements subject to said constraint, which interactive joint angle movements attempt to satisfy said stored input goal;

means for calculating the error between said stored motion joint angle commands and said interactive joint angle commands;

means for comparing said error to a predetermined error value; and means for modifying at least one parameter of said interactive apparatus if said error is greater than said predetermined error value;

whereby said parameter of said interactive apparatus is adjusted in accordance with said stored motion data.

36. An apparatus in accordance with claim 35, wherein said adjustable parameter is a synergy gain.

37. An apparatus in accordance with claim 35, wherein said adjustable parameter is a synergy strength.

38. An apparatus in accordance with claim 35, wherein said constraint is position.

39. An apparatus in accordance with claim 35, wherein said constraint is alignment.

40. An apparatus in accordance with claim 35, wherein said constraint is obstacle avoidance.

41. An apparatus in accordance with claim 35, wherein said constraint is balance.

42. An apparatus in accordance with claim 35, wherein said constraint is posture.

* * * * *